(12) United States Patent
Chen et al.

(10) Patent No.: US 11,360,825 B2
(45) Date of Patent: Jun. 14, 2022

(54) SYSTEMS AND METHODS FOR SERVICE RESOURCE ALLOCATION AND DEPLOYMENT

(71) Applicant: Citrix Systems, Inc., Burlington, MA (US)

(72) Inventors: Yongyu Chen, Nanjing (CN); Liang Bao, Nanjing (CN); Ruiqi Liang, Nanjing (CN); Lei Xu, Nanjing (CN)

(73) Assignee: CITRIX SYSTEMS, INC., Burlington, MA (US)

( * ) Notice: Subject to any disclaimer, the term of this patent is extended or adjusted under 35 U.S.C. 154(b) by 0 days.

(21) Appl. No.: 16/773,019

(22) Filed: Jan. 27, 2020

(65) Prior Publication Data

US 2021/0182117 A1 Jun. 17, 2021

Related U.S. Application Data

(63) Continuation of application No. PCT/CN2019/125818, filed on Dec. 17, 2019.

(51) Int. Cl.
| | |
|---|---|
| *G06F 9/50* | (2006.01) |
| *G06F 9/455* | (2018.01) |
| *H04L 47/785* | (2022.01) |
| *H04L 45/00* | (2022.01) |
| *G06F 11/34* | (2006.01) |

(52) U.S. Cl.
CPC ........ *G06F 9/5077* (2013.01); *G06F 9/45533* (2013.01); *G06F 9/45558* (2013.01); *G06F 9/505* (2013.01); *G06F 9/5072* (2013.01); *G06F 11/3409* (2013.01); *G06F 11/3442* (2013.01); *H04L 45/46* (2013.01); *H04L 47/786* (2013.01); *G06F 2009/4557* (2013.01)

(58) Field of Classification Search
CPC ............... G06F 9/5077; G06F 11/3409; G06F 9/45533; G06F 11/3442; G06F 9/45558; G06F 9/5072; G06F 9/505; G06F 2009/4557; H04L 47/786; H04L 45/46
See application file for complete search history.

(56) References Cited

U.S. PATENT DOCUMENTS

| | | | |
|---|---|---|---|
| 8,346,722 B2* | 1/2013 | Mordvinova | G06F 16/27 707/610 |
| 8,812,586 B1* | 8/2014 | Kulkarni | H04L 67/10 709/203 |
| 9,619,293 B1* | 4/2017 | Cropper | G06F 9/5077 |
| 9,998,562 B1* | 6/2018 | Peterson | G06F 8/72 |
| 10,324,643 B1* | 6/2019 | Huang | G06F 3/0607 |
| 10,592,328 B1* | 3/2020 | Thompson | G06F 11/0793 |

(Continued)

*Primary Examiner* — Michael A Keller
(74) *Attorney, Agent, or Firm* — Michael T. Abramson; Holland & Knight LLP

(57) ABSTRACT

A method, computer program product, and computer system for determining, by a computing device, a service instance count for each of a plurality of services to be executed on a plurality of host devices. A similarity between the plurality of services may be determined. A host instance count for the plurality of host devices may be determined based upon, at least in part, the similarity between the plurality of services. Each service instance may be allocated to a respective host device for execution based upon, at least in part, the similarity between the plurality of services, the service instance count, and the host service count.

20 Claims, 10 Drawing Sheets

(56) References Cited

U.S. PATENT DOCUMENTS

| | | | | |
|---|---|---|---|---|
| 10,884,778 | B1* | 1/2021 | Dunagan | H04L 67/10 |
| 2008/0147945 | A1* | 6/2008 | Zimmer | G06F 12/02 |
| | | | | 710/260 |
| 2011/0179176 | A1* | 7/2011 | Ravichandran | H04L 29/0809 |
| | | | | 709/226 |
| 2013/0283176 | A1* | 10/2013 | Hoole | H04L 63/20 |
| | | | | 715/736 |
| 2013/0283273 | A1* | 10/2013 | Miyazaki | G06F 11/3409 |
| | | | | 718/1 |
| 2018/0146069 | A1* | 5/2018 | Du | H04L 41/042 |
| 2018/0219899 | A1* | 8/2018 | Joy | G06F 9/5027 |
| 2019/0034313 | A1* | 1/2019 | Vedurumudi | H04L 43/04 |
| 2020/0133702 | A1* | 4/2020 | Sharma | G06F 9/505 |
| 2020/0401449 | A1* | 12/2020 | Zhang | G06F 9/505 |

* cited by examiner

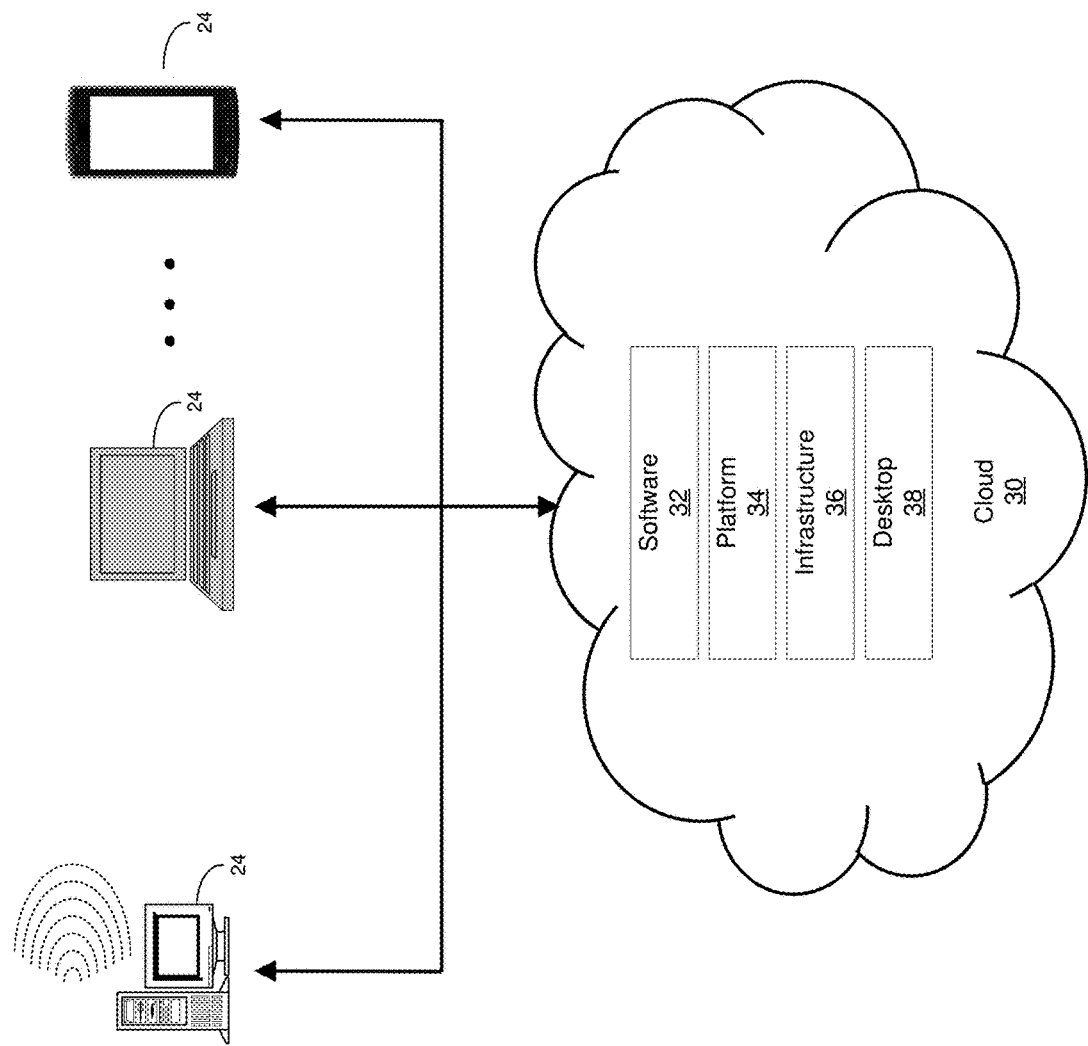

SYSTEMS AND METHODS FOR SERVICE RESOURCE ALLOCATION AND DEPLOYMENT

RELATED APPLICATION

This application is a continuation of PCT International Application No. PCT/CN2019/125818, filed on 17 Dec. 2019, the entire contents of which are incorporated herein by reference.

BACKGROUND

Currently, some entities may use a "Canary" (or similar) release and Test/Staging/Production Layer based release strategy to help ensure service releases progress in a fast and steady pace. Moreover, the requirement of release speeds may also promote challenges on service deploying, for example, when it comes to micro-service based deployment, which may allow multiple services to be deployed in one single host.

BRIEF SUMMARY OF DISCLOSURE

In one example implementation, a method, performed by one or more computing devices, may include but is not limited to determining, by a computing device, a service instance count for each of a plurality of services to be executed on a plurality of host devices. A similarity between the plurality of services may be determined. A host instance count for the plurality of host devices may be determined based upon, at least in part, the similarity between the plurality of services. Each service instance may be allocated to a respective host device for execution based upon, at least in part, the similarity between the plurality of services, the service instance count, and the host service count.

One or more of the following example features may be included. The service instance count may be determined based upon, at least in part, a resource capacity model and usage data. The similarity between the plurality of services may be based upon, at least in part, a correlation of resource consumption for the plurality of services. Allocating each service instance may include grouping services of the plurality of services on at least one host device of the plurality of host devices based upon, at least in part, the correlation of resource consumption for the grouped services. The correlation of resource consumption for the plurality of services may be based upon, at least in part, historical resource consumption data for the plurality of services. The host instance count may be determined based upon, at least in part, a usage threshold of at least one host device of the plurality of host devices. At least one service of the plurality of services may be migrated from a first host device of the plurality of host devices to a second host device of the plurality of host devices.

In another example implementation, a computing system may include one or more processors and one or more memories configured to perform operations that may include but are not limited to determining a service instance count for each of a plurality of services to be executed on a plurality of host devices. A similarity between the plurality of services may be determined. A host instance count for the plurality of host devices may be determined based upon, at least in part, the similarity between the plurality of services. Each service instance may be allocated to a respective host device for execution based upon, at least in part, the similarity between the plurality of services, the service instance count, and the host service count.

One or more of the following example features may be included. The service instance count may be determined based upon, at least in part, a resource capacity model and usage data. The similarity between the plurality of services may be based upon, at least in part, a correlation of resource consumption for the plurality of services. Allocating each service instance may include grouping services of the plurality of services on at least one host device of the plurality of host devices based upon, at least in part, the correlation of resource consumption for the grouped services. The correlation of resource consumption for the plurality of services may be based upon, at least in part, historical resource consumption data for the plurality of services. The host instance count may be determined based upon, at least in part, a usage threshold of at least one host device of the plurality of host devices. At least one service of the plurality of services may be migrated from a first host device of the plurality of host devices to a second host device of the plurality of host devices.

In another example implementation, a computer program product may reside on a computer readable storage medium having a plurality of instructions stored thereon which, when executed by one or more processors, may cause the one or more processors to perform operations that may include but are not limited to determining, by a computing device, a service instance count for each of a plurality of services to be executed on a plurality of host devices. A similarity between the plurality of services may be determined. A host instance count for the plurality of host devices may be determined based upon, at least in part, the similarity between the plurality of services. Each service instance may be allocated to a respective host device for execution based upon, at least in part, the similarity between the plurality of services, the service instance count, and the host service count.

One or more of the following example features may be included. The service instance count may be determined based upon, at least in part, a resource capacity model and usage data. The similarity between the plurality of services may be based upon, at least in part, a correlation of resource consumption for the plurality of services. Allocating each service instance may include grouping services of the plurality of services on at least one host device of the plurality of host devices based upon, at least in part, the correlation of resource consumption for the grouped services. The correlation of resource consumption for the plurality of services may be based upon, at least in part, historical resource consumption data for the plurality of services. The host instance count may be determined based upon, at least in part, a usage threshold of at least one host device of the plurality of host devices. At least one service of the plurality of services may be migrated from a first host device of the plurality of host devices to a second host device of the plurality of host devices.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 3 is an example diagrammatic view of an example cloud computing environment according to one or more example implementations of the disclosure;

Like reference symbols in the various drawings may indicate like elements.

DETAILED DESCRIPTION

Figure 1:
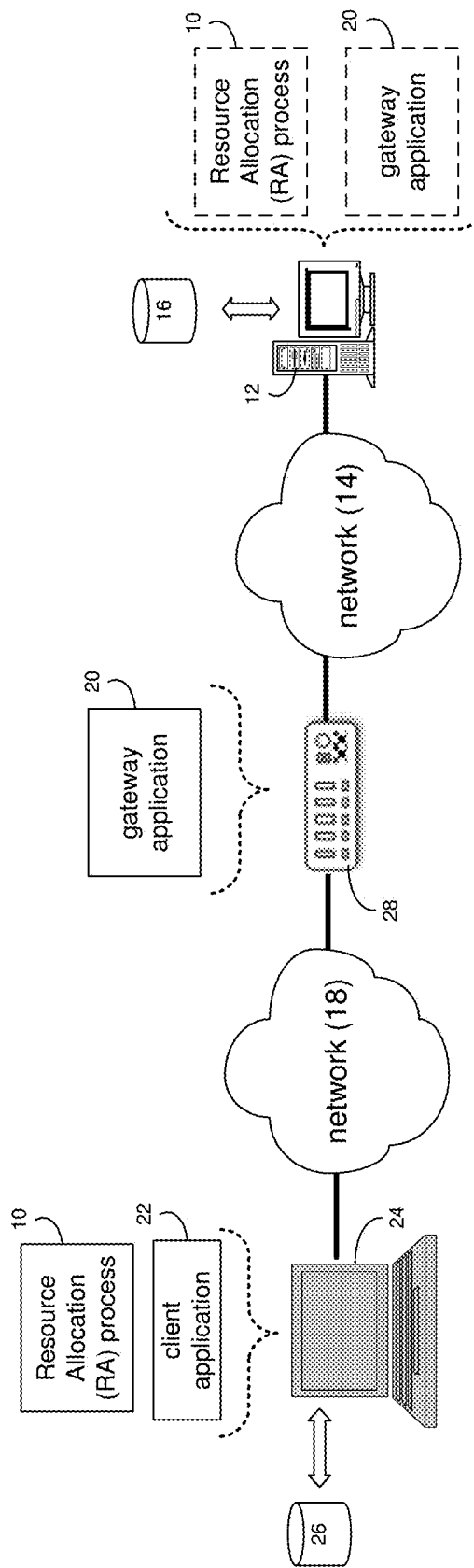
FIG. 1 is an example diagrammatic view of an example network environment according to one or more example implementations of the disclosure.

Deploying an application, or an update to an existing application, in a computing environment, such as a cloud-computing environment, may raise a number of challenges. For example, the application or update may include one or more errors that, once the application or update is deployed, negatively impact the performance of the cloud-computing environment. Performing additional testing on the application or update may be undesirable and/or may not locate the errors that are causing lower performance of the cloud-computing environment. Accordingly, to overcome these example and non-limiting issues, and to overcome other limitations that will be apparent upon reading and understanding the present disclosure, aspects described herein may include example systems and methods that may be used to expose the application or update over time to an increasing percentage of users within the cloud-computing environment. This form of deployment, where the application or update is exposed over time to an increasing percentage of users, is commonly referred to as canary deployment.

Entities may use the canary (or similar) release and Test/Staging/Production Layer based release strategy to help ensure service releases progress in a fast and steady pace. Moreover, the requirement of release speeds may also promote challenges on service deploying, for example, when it comes to micro-service based deployment, which may allow multiple services to be deployed in one single host. Since sometimes those service(s) may have a race condition against the shared host resource, a simple function/load test may not discover that insufficient resources are available before the release stage. Therefore, as will be discussed below, the present disclosure may enable the allocation of enough resources for each host, as well as enough space for the service(s) to allow them to be able to handle current release strategy. It will be appreciated that while a micro service is described, it will be appreciated that the present disclosure may work for any deployment that involves multiple applications being deployed on overlapping host servers at once. As such, the use of a micro-service should be taken as example only and not to otherwise limit the scope of the present disclosure.

Additionally, resources can be very expensive in a cloud computing environment. Thus, to save more resources, it may be advantageous to better estimate the instance (number) count for each service. Therefore, as will also be discussed below, the present disclosure may enable a precise resource capacity model that reflects the relationship between requests and resource consumption. Moreover, as will also be discussed below, the present disclosure may enable an estimation of current request peak quantity, which with the resource capacity model, may enable better selecting of the service instance count.

Accordingly, as will be discussed below, the present disclosure discusses a deployment and resource allocation strategy for services inside, e.g., a micro-service management platform, which may integrate data analysis against the canary release and Test/Staging/Production Layer based release strategy. Previously, the deployment and resource allocation strategy did not take the advantage of a release strategy, which resulted in, e.g., resource waste and lack of risk alert. The present disclosure may enable the launch of a simulation test in a staging environment to collect and build a model to predict the actual usage as the canary process goes on. As a result, the present disclosure may enable execution of an optimal deployment strategy of services (e.g., optimal number of host servers, optimal number of services executed on the host servers, and optimal placement of the services on the host servers) by resolving several optimization functions.

Referring now to the example implementation of FIG. 1, there is shown resource allocation process 10 that may reside on and may be executed by a computer (e.g., one or more remote machines also referred to as computer 12), which may be connected to a network (e.g., network 14) (e.g., the internet or a local area network). In some implementations, the instruction sets and subroutines of resource allocation process 10, which may be stored on storage device, such as storage device 16, coupled to computer 12, may be executed by one or more processors and one or more memory architectures included within computer 12. In some implementations, resource allocation process 10 may be a component of a data store, a standalone application that interfaces with the above noted data store and/or an applet/application that is accessed via client application 22. In some implementations, the above noted data store may be, in whole or in part, distributed in a cloud computing topology. In this way, computer 12 and storage device 16 may refer to multiple devices, which may also be distributed throughout the network. Computer 12 (e.g., via resource allocation process 10) may execute, operate or otherwise provide an application that may be any one of the following: software; a program; executable instructions; a virtual machine; a hypervisor; a web browser; a web-based client; a client-server application; a thin-client computing client; an ActiveX control; a Java® applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. In some implementations, resource allocation process 10 and/or gateway application 20 may be accessed via one or more of client applications to facilitate the transfer of data and/or information among computer 12 and client electronic device 24 via network 14 and/or network 18. Client electronic device 24 (and/or computer 12) may include, but are not limited to, a personal computer, a mobile computing device such as a laptop computer, a smart/data-enabled, cellular phone, a notebook computer, and a tablet, a television, a smart speaker, an Internet of Things (IoT) device, a media (e.g., audio/video, photo, etc.) capturing and/or output device, an audio input and/or recording device (e.g., a microphone), a storage system (e.g., a Network Attached Storage (NAS) system, a Storage Area Network (SAN)), a server computer (e.g., a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality), a series of server computers, a server farm/datacenter, a mainframe computer, a computing cloud, or any other network enabled device. In some implementations, each of the aforementioned may be generally described as a computing device, and may also be referred to as a local machine, a client, a client node, a client computer, a client device, a client electronic device, a computing device, a computer, an endpoint, or an endpoint node, herein referred to as either a client electronic device or a computer. In some implementations, client electronic devices 24 may have the capacity to function as a client node seeking access to resources provided by computer 12. The client electronic devices 24 may be further configured to host resources accessible by computer 12.

In certain implementations, the client electronic devices 24 and/or computer 12 may be a physical or virtual device. In many implementations, the client electronic devices 24 and/or computer 12 may be any device capable of performing operations, such as a dedicated processor, a portion of a processor, a virtual processor, a portion of a virtual processor, portion of a virtual device, or a virtual device. In some implementations, a processor may be a physical processor or a virtual processor. The client electronic devices 24 and/or computer 12 may be a virtual machine that may provide to a user of the client electronic device access to a computing environment. The virtual machine may be managed by, for example, a hypervisor, a virtual machine manager (VMM), or any other hardware virtualization technique. In some implementations, a virtual processor may correspond to one or more parts of one or more physical processors. In some implementations, the instructions/logic may be distributed and executed across one or more processors, virtual or physical, to execute the instructions/logic. The client electronic devices and/or computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, the client electronic devices 24 and/or computer 12 may include storage devices (e.g., storage device 16, 26) such as: an electrical connection having one or more wires; a portable computer diskette; a hard disk drive; all forms of flash memory storage devices including an erasable programmable read-only memory (EPROM); a tape drive; an optical drive/fiber; a Redundant Array of Independent Disks (RAID) array (or other array); a random access memory (RAM); a read-only memory (ROM); a portable compact disc read-only memory (CD-ROM); a digital versatile disk (DVD); a static random access memory (SRAM); a memory stick; a floppy disk; a mechanically encoded device; a media such as those supporting the internet or an intranet; a magnetic storage device; or combination thereof. In some implementations, the client electronic devices 24 and/or computer 12 may include a data store, such as a database (e.g., relational database, object-oriented database, triplestore database, etc.) and may be located within any suitable memory location (e.g., storage device 16 coupled to computer 12). In some implementations, the storage devices 16 and 26 may be communicatively coupled to the client electronic devices 24 and/or computer 12 to store data, metadata, or other information to facilities operation of the present disclosure.

In some implementations, the client electronic devices 24 and/or computer 12 may be communicatively coupled to the data store so that data, metadata, information, etc. described throughout the present disclosure may be stored and accessed. In some implementations, the client electronic devices 24 and/or computer 12 may provide multi-user access to one or more databases, such as the above noted relational database. In some implementations, the data store may also be a custom database, such as, for example, a flat file database or an XML database. In some implementations, any other form(s) of a data storage structure and/or organization may also be used.

In some implementations, computer 12 and/or appliance 28 may execute a gateway application (e.g., gateway application 20) discussed further below. An example of gateway application 20 may include, but is not limited to, e.g., Citrix Gateway, provided by Citrix Systems, Inc. of Ft. Lauderdale, Fla.

In some implementations, resource allocation process 10 may be a standalone application, or may be an applet/application/script/extension that may interact with and/or be executed within gateway application 20, a component of gateway application 20, and/or one or more of the client applications. In some implementations, gateway application 20 may be a standalone application, or may be an applet/application/script/extension that may interact with and/or be executed within resource allocation process 10, a component of resource allocation process 10, and/or one or more of the client applications. In some implementations, one or more of the client applications may be a standalone application, or may be an applet/application/script/extension that may interact with and/or be executed within and/or be a component of resource allocation process 10 and/or gateway application 20. Examples of client applications may include, but are not limited to, e.g., a web conferencing application, a video conferencing application, a voice-over-IP application, a video-over-IP application, an Instant Messaging (IM)/"chat" application, a short messaging service (SMS)/multimedia messaging service (MMS) application, a remote presentation services program or other program that uses a thin-client or a remote-display protocol to capture display output generated by an application executing on computer 12 and transmit the output to the client electronic device 24, or other application that allows for file sharing or even the general viewing of any content (e.g., website content, streaming video games or movies, etc.) on a computing device, a standard and/or mobile web browser, an email application (e.g., an email client application), a textual and/or a graphical user interface, a customized web browser, a plugin, an Application Programming Interface (API), or a custom application. The instruction sets and subroutines of client application 22, which may be stored on storage device 26, coupled to client electronic device 24, may be executed by one or more processors and one or more memory architectures incorporated into client electronic device 24.

In some implementations, client application 22 may be configured to effectuate some or all of the functionality of resource allocation process 10 (and resource allocation process 10 may be configured to effectuate some or all of the functionality of client application 22). Accordingly, in various implementations, resource allocation process 10 may be a purely server-side application, a purely client-side application, or a hybrid server-side/client-side application that is cooperatively executed by one or more of the client applications and/or resource allocation process 10.

In some implementations, client application 22 may be configured to effectuate some or all of the functionality of gateway application 20 (and gateway application 20 may be configured to effectuate some or all of the functionality of client application 22). Accordingly, in various implementations, gateway application 20 may be a purely server-side application, a purely client-side application, or a hybrid server-side/client-side application that is cooperatively executed by one or more of the client applications and/or gateway application 20. As one or more of the client applications, resource allocation process 10, and gateway application 20, taken singly or in any combination, may effectuate some or all of the same functionality, any description of effectuating such functionality via one or more of the client applications, resource allocation process 10, gateway application 20, or combination thereof, and any described interaction(s) between one or more of the client applications, resource allocation process 10, gateway application 20, or combination thereof to effectuate such functionality, should be taken as an example only and not to limit the scope of the disclosure.

In some implementations, one or more users may access computer 12 and resource allocation process 10 (e.g., using one or more of client electronic devices) directly through network 14 or through secondary network 18, and resource allocation process 10 may include one or more user interfaces, such as browsers and textual or graphical user interfaces, through which users may access resource allocation process 10. Further, in some implementations, computer 12 may be connected to network 14 through secondary network 18. In some implementations, the client electronic devices 24 may communicate with computer 12 (and vice versa) via intermediary appliance (e.g., appliance 28), which in some implementations may include resource allocation process 10. Appliance 28 may be positioned between networks 14 and 18, and may also be referred to as a network interface or gateway. In some implementations, appliance 28 may operate as an application delivery controller (ADC) to provide users with access to business applications and other data deployed in a datacenter, a cloud environment, or delivered as Software as a Service (SaaS) across a range of computing devices, and/or provide other functionality such as load balancing, etc. In some implementations, multiple appliances may be used, and appliance(s) 28 may be deployed as part of network 14 and/or 18.

In some implementations, one or more client electronic devices 24 and/or computer 12 may be directly or indirectly coupled to networks 14 and/or 18 via a network connection (e.g., a wireless or a hardwired network connection). Further, in some examples, a wireless communication connection may include a wireless access point (WAP). The wireless access point may be, for example, an IEEE 802.11a, 802.11b, 802.11g, 802.11n, 802.11ac, Wi-Fi®, RFID, and/or Bluetooth™ (e.g., 802.15) (including Bluetooth™ Low Energy) device that is capable of establishing wireless communication channel (e.g., between client electronic device 24 and the WAP). In some examples, the client electronic devices and/or computer 12 may be wirelessly coupled to a network via wireless communication channel using cellular network/bridge.

In some implementations, networks 14 and/or 18 may include and/or be connected to one or more secondary networks, examples of which may include but are not limited to: a local area network (LAN); a personal area network (PAN); a metropolitan area network (MAN); a wide area network (WAN) or other telecommunications network facility, a primary public network; a primary private network; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of wireless local-area network (WLAN) interconnection (e.g., Near Field Communication (NFC)) may also be used.

In some implementations, various input/output (I/O) requests may be sent from, e.g., client application 22 to, e.g., computer 12 (and vice versa) using network 14 and/or 18. Examples of an I/O request may include but are not limited to, data write requests (e.g., a request that content be written to computer 12) and data read requests (e.g., a request that content be read from computer 12).

Figure 2:
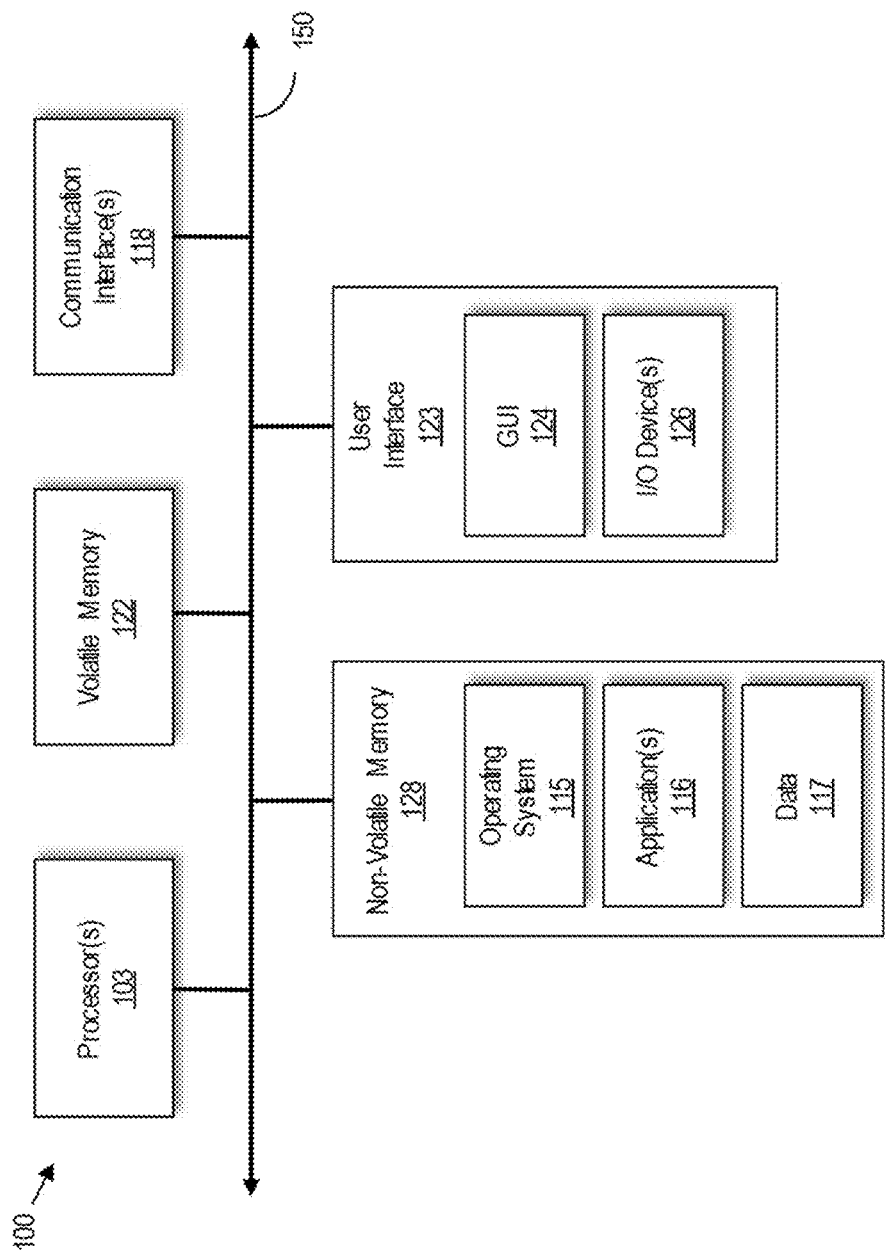
FIG. 2 is an example diagrammatic view of a computing device of FIG. 1 according to one or more example implementations of the disclosure.

Referring also to the example implementation of FIG. 2, there is shown a block diagram of computing device 100 that may be useful for practicing an implementation of the client electronic devices, appliance 28 and/or computer 12. Computing device 100 may include one or more processors 103, volatile memory 122 (e.g., random access memory (RAM)), non-volatile memory 128, user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

UI 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 may store operating system 115, one or more applications 116, and data 117 such that, for example, computer instructions of operating system 115 and/or applications 116 are executed by processor(s) 103 out of volatile memory 122. In some implementations, volatile memory 122 may include one or more types of RAM and/or a cache memory that may offer a faster response time than a main memory. Data may be entered using an input device of GUI 124 or received from I/O device(s) 126. Various elements of computer 100 may communicate via communications bus 150.

Computing device 100 is shown merely as an example client device or server, and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" may describe circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some implementations, the processor may be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed-signal. In some implementations, processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described implementations, computing device 100 may execute an application (e.g., the above-noted client application) on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Referring also to the example implementation of FIG. 3, a cloud computing environment is depicted, which may also be referred to as a cloud environment, cloud computing or cloud network. The cloud computing environment may provide the delivery of shared computing services and/or resources to multiple users or tenants. For example, the shared resources and services may include, but are not limited to, networks, network bandwidth, servers, processing, memory, storage, applications, virtual machines, databases, software, hardware, analytics, and intelligence.

In the cloud computing environment, one or more client electronic devices 24 (such as those described above) may be in communication with cloud network 30. In some implementations, cloud network 30 may be also generally referred to as network 14 and/or 18 from FIG. 1). Cloud network 30 may include back-end platforms, e.g., servers, storage, server farms or data centers. The users or client electronic devices 24 may correspond to a single organization/tenant or multiple organizations/tenants. More particularly, in one example implementation, the cloud computing environment may provide a private cloud serving a single organization (e.g., enterprise cloud). In another example, the cloud computing environment may provide a community or public cloud serving multiple organizations/tenants.

In some embodiments, a gateway appliance(s) or service may be utilized to provide access to cloud computing resources and virtual sessions (e.g., via a gateway application). By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment may provide a hybrid cloud that is a combination of a public cloud and a private cloud. Public clouds may include public servers that are maintained by third parties to the client electronic devices 24 or the enterprise/tenant. The servers may be located off-site in remote geographical locations or otherwise.

The cloud computing environment may provide resource pooling to serve multiple users via client electronic devices 24 through a multi-tenant environment or multi-tenant model with different physical and virtual resources dynamically assigned and reassigned responsive to different demands within the respective environment. The multi-tenant environment may include a system or architecture that may provide a single instance of software, an application or a software application to serve multiple users. In some embodiments, the cloud computing environment may provide on-demand self-service to unilaterally provision computing capabilities (e.g., server time, network storage) across a network for multiple client electronic devices 24.

By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment may provide an elasticity to dynamically scale out or scale in response to different demands from one or more client electronic devices 24. In some embodiments, the cloud computing environment may include or provide monitoring services to monitor, control and/or generate reports corresponding to the provided shared services and resources.

In some embodiments, the cloud computing environment may provide cloud-based delivery of different types of cloud computing services, such as Software as a service (SaaS) 32, Platform as a Service (PaaS) 34, Infrastructure as a Service (IaaS) 36, and Desktop as a Service (DaaS) 38, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS may include, e.g., AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS may include, e.g., WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS may include, e.g., GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one non-limiting example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
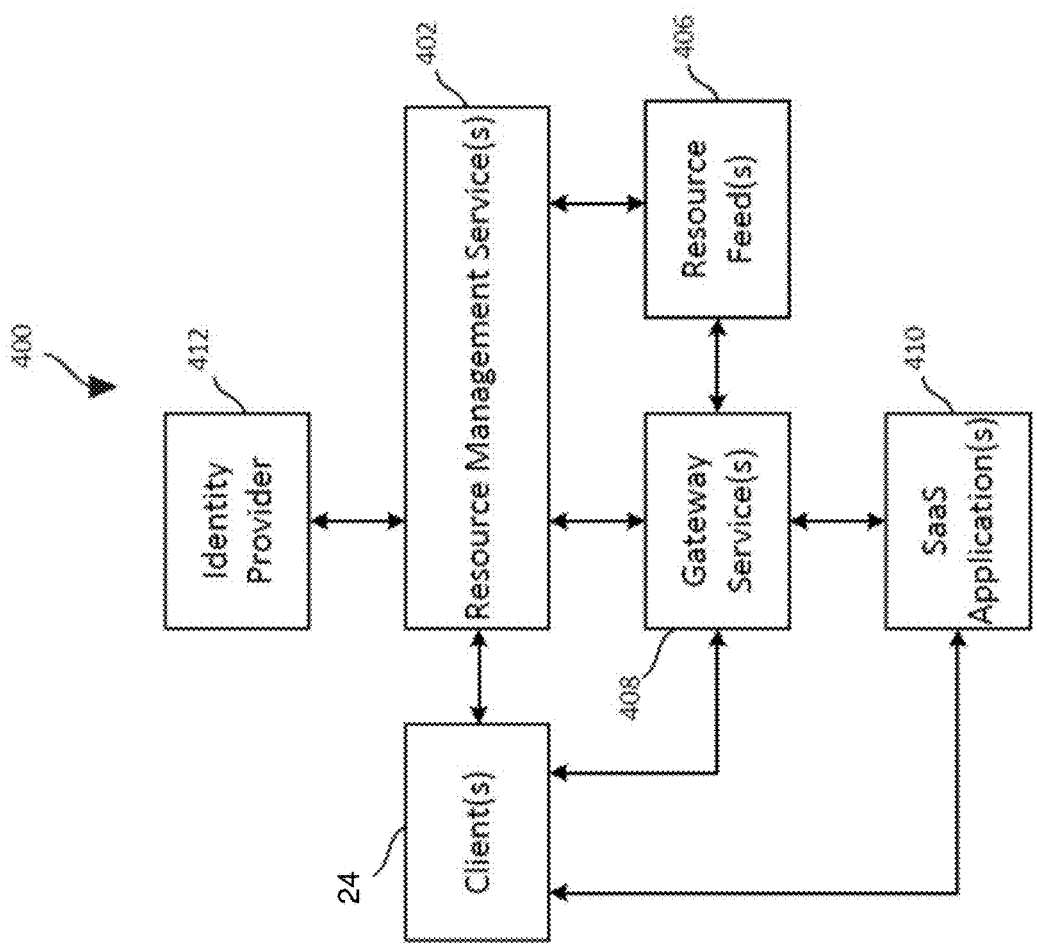
FIG. 4A is an example block diagram of an example system in which resource management services may manage and streamline access by clients to resource feeds (via one or more gateway services) and/or software-as-a-service (SaaS) applications according to one or more example implementations of the disclosure.

Referring also to the example implementation of FIG. 4A, an example block diagram of an example system 400 in which one or more resource management services 402 may manage and streamline access by one or more client electronic devices 24 (such as those described above in FIGS. 1 and 2) to one or more resource feeds 406 (via one or more gateway services 408 such as those described above) and/or one or more software-as-a-service (SaaS) applications 410 (such as those described above). In particular, the resource management service(s) 402 may employ identity provider 412 to authenticate the identity of a user of client electronic device 24 and, following authentication, identify one of more resources the user is authorized to access. In response to the user selecting one of the identified resources, resource management service(s) 402 may send appropriate access credentials to requesting client electronic device 24, and client electronic device 24 may then use those credentials to access the selected resource. For resource feed(s) 406, client electronic device 24 may use the supplied credentials to access the selected resource via a gateway service 408. For SaaS application(s) 410, client electronic device 24 may use the credentials to access the selected application directly.

The client electronic device(s) 24 may be any type of computing devices capable of accessing resource feed(s) 406 and/or SaaS application(s) 410, and may, for example, include a variety of desktop or laptop computers, smartphones, tablets, etc. Resource feed(s) 406 may include any of numerous resource types and may be provided from any of numerous locations. In some implementations, for example, resource feed(s) 406 may include one or more systems or services for providing virtual applications and/or desktops to client electronic device(s) 24, one or more file repositories and/or file sharing systems, one or more secure browser services, one or more access control services for SaaS applications 410, one or more management services for local applications on client electronic device(s) 24, one or more internet enabled devices or sensors, etc. Each of resource management service(s) 402, resource feed(s) 406, gateway service(s) 408, SaaS application(s) 410, and the identity provider 412 may be located within an on-premises data center of an organization for which system 400 is deployed, within one or more cloud computing environments, or elsewhere.

Figure 4B:
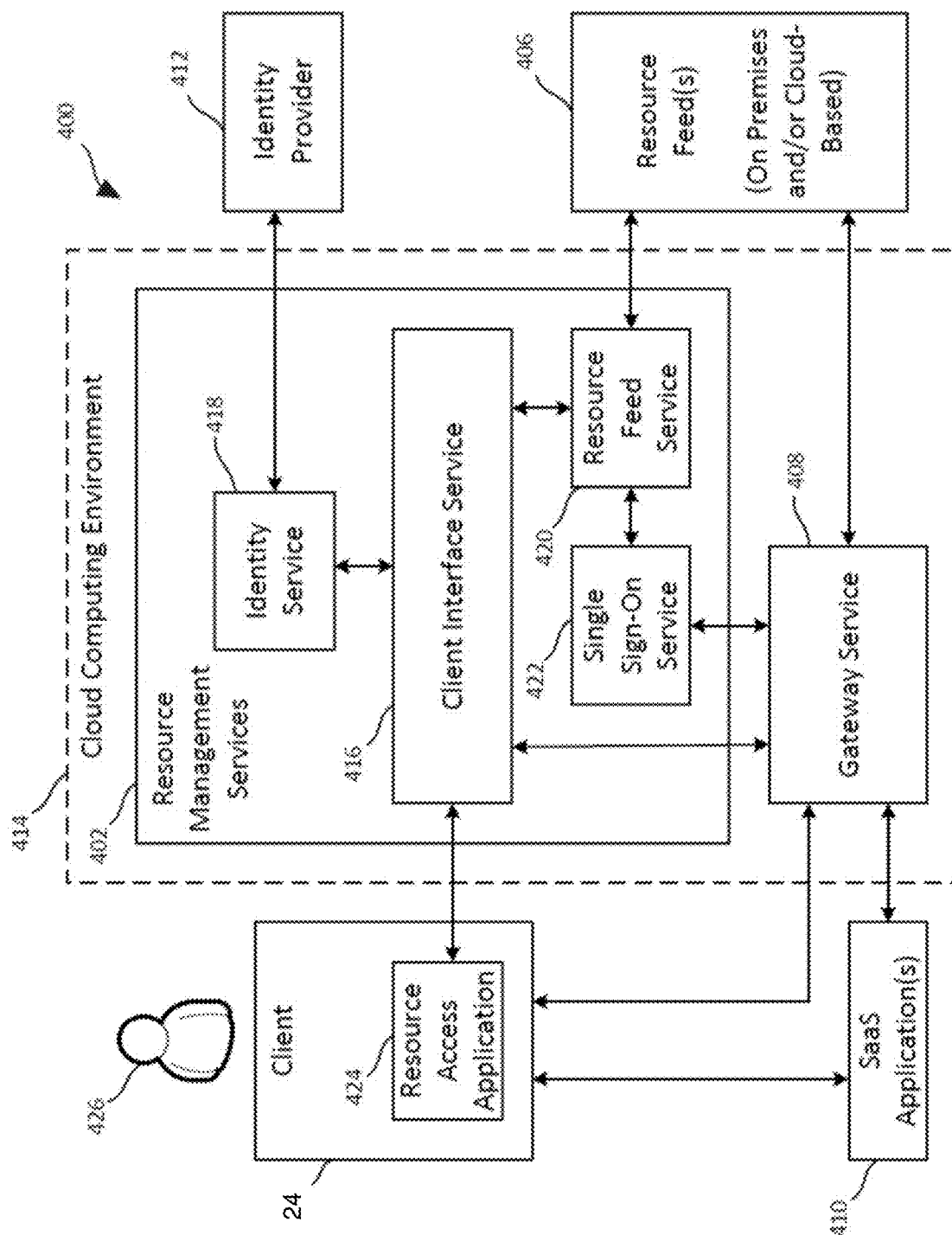
FIG. 4B is an example block diagram showing an example implementation of the system shown in FIG. 4A in which various resource management services as well as a gateway service are located within a cloud computing environment similar to that shown in FIG. 2 according to one or more example implementations of the disclosure.

Referring also to the example implementation of FIG. 4B, and example block diagram includes an example implementation of system 400 shown in FIG. 4A in which various resource management services 402 as well as gateway service 408 are located within cloud computing environment 414. The cloud computing environment may, for example, include Microsoft Azure Cloud, Amazon Web Services, Google Cloud, or IBM Cloud.

For any of components shown (other than client electronic device 24) that are not based within cloud computing environment 414, cloud connectors may be used to interface those components with cloud computing environment 414. Such cloud connectors may, for example, run on Windows Server instances hosted in resource locations and may create a reverse proxy to route traffic between the site(s) and cloud computing environment 414. In the example, cloud-based resource management services 402 include client interface service 416, identity service 418, resource feed service 420, and single sign-on service 422. As shown, in some implementations, client electronic device 24 may use resource access application 424 to communicate with client interface service 416 as well as to present a user interface on client electronic device 24 that user 426 can operate to access resource feed(s) 406 and/or SaaS application(s) 410.

Resource access application 424 may either be installed on client electronic device 24, or may be executed by client interface service 416 (or elsewhere in system 400) and accessed using a web browser on client electronic device 24.

As explained in more detail below, in some implementations, resource access application 424 and associated components may provide user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When resource access application 424 is launched or otherwise accessed by user 426, client interface service 416 may send a sign-on request to identity service 418. In some implementations, identity provider 412 may be located on the premises of the organization for which system 400 is deployed. Identity provider 412 may, for example, correspond to an on-premises Windows Active Directory. In such implementations, identity provider 412 may be connected to the cloud-based identity service 418 using a cloud connector, as described above. Upon receiving a sign-on request, identity service 418 may cause resource access application 424 (via the client interface service 416) to prompt user 426 for the user's authentication credentials (e.g., user-name and password). Upon receiving the user's authentication credentials, client interface service 416 may pass the credentials along to identity service 418, and identity service 418 may, in turn, forward them to identity provider 412 for authentication, for example, by comparing them against an Active Directory domain. Once identity service 418 receives confirmation from identity provider 412 that the user's identity has been properly authenticated, client interface service 416 may send a request to resource feed service 420 for a list of subscribed resources for user 426.

In some implementations, identity provider 412 may be a cloud-based identity service, such as a Microsoft Azure Active Directory. In such implementations, upon receiving a sign-on request from client interface service 416, identity service 418 may, via client interface service 416, cause client electronic device 24 to be redirected to the cloud-based identity service to complete an authentication process. The cloud-based identity service may then cause client electronic device 24 to prompt user 426 to enter the user's authentication credentials. Upon determining the user's identity has been properly authenticated, the cloud-based identity service may send a message to resource access application 424 indicating the authentication attempt was successful, and resource access application 424 may then inform client interface service 416 of the successfully authentication. Once identity service 418 receives confirmation from client interface service 416 that the user's identity has been properly authenticated, client interface service 416 may send a request to resource feed service 420 for a list of subscribed resources for user 426.

For each configured resource feed, resource feed service 420 may request an identity token from single sign-on service 422. Resource feed service 420 may then pass the feed-specific identity tokens it receives to the points of authentication for the respective resource feeds 406. Each resource feed 406 may then respond with a list of resources configured for the respective identity. Resource feed service 420 may then aggregate all items from the different feeds and forward them to client interface service 416, which may cause resource access application 424 to present a list of available resources on a user interface of client electronic device 24. The list of available resources may, for example, be presented on the user interface of client electronic device 24 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on client electronic device 24, and/or one or more SaaS applications 410 to which user 426 has subscribed. The lists of local applications and SaaS applications 410 may, for example, be supplied by resource feeds 406 for respective services that manage which such applications are to be made available to user 426 via the resource access application 424. Examples of SaaS applications 410 that may be managed and accessed as described herein include Microsoft Office 365 applications, SAP SaaS applications, Workday applications, etc.

For resources other than local applications and SaaS application(s) 410, upon user 426 selecting one of the listed available resources, resource access application 424 may cause client interface service 416 to forward a request for the specified resource to resource feed service 420. In response to receiving such a request, resource feed service 420 may request an identity token for the corresponding feed from single sign-on service 422. Resource feed service 420 may then pass the identity token received from single sign-on service 422 to client interface service 416 where a launch ticket for the resource may be generated and sent to resource access application 424. Upon receiving the launch ticket, resource access application 424 may initiate a secure session to gateway service 408 and present the launch ticket. When gateway service 408 is presented with the launch ticket, it may initiate a secure session to the appropriate resource feed and present the identity token to that feed to seamlessly authenticate user 426. Once the session initializes, client electronic device 24 may proceed to access the selected resource.

When user 426 selects a local application, resource access application 424 may cause the selected local application to launch on client electronic device 24. When user 426 selects SaaS application 410, resource access application 424 may cause client interface service 416 request a one-time uniform resource locator (URL) from gateway service 408 as well a preferred browser for use in accessing SaaS application 410. After gateway service 408 returns the one-time URL and identifies the preferred browser, client interface service 416 may pass that information along to resource access application 424. Client electronic device 24 may then launch the identified browser and initiate a connection to gateway service 408. Gateway service 408 may then request an assertion from single sign-on service 422. Upon receiving the assertion, gateway service 408 may cause the identified browser on client electronic device 24 to be redirected to the logon page for identified SaaS application 410 and present the assertion. The SaaS may then contact gateway service 408 to validate the assertion and authenticate user 426. Once the user has been authenticated, communication may occur directly between the identified browser and the selected SaaS application 410, thus allowing user 426 to use client electronic device 24 to access the selected SaaS application 410.

In some implementations, the preferred browser identified by gateway service 408 may be a specialized browser embedded in resource access application 424 (when the resource application is installed on client electronic device 24) or provided by one of resource feeds 406 (when resource application 424 is located remotely), e.g., via a secure browser service. In such implementations, SaaS applications 410 may incorporate enhanced security policies to enforce one or more restrictions on the embedded browser. Examples of such policies may include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with client electronic device 24 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of resource feed(s) 406) for assessment of its security risk by a web filtering service. For approved URLs, the specialized browser may be permitted to access the link. For suspicious links, however, the web filtering service may have client interface service 416 send the link to a secure browser service, which may start a new virtual browser session with client electronic device 24, and thus allow the user to access the potentially harmful linked content in a safe environment.

In some implementations, in addition to or in lieu of providing user 426 with a list of resources that are available to be accessed individually, as described above, user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to client electronic device 24 to notify user 426 of something that requires the user's attention (e.g., approval of an expense report, new course available for registration, etc.).

Figure 4C:
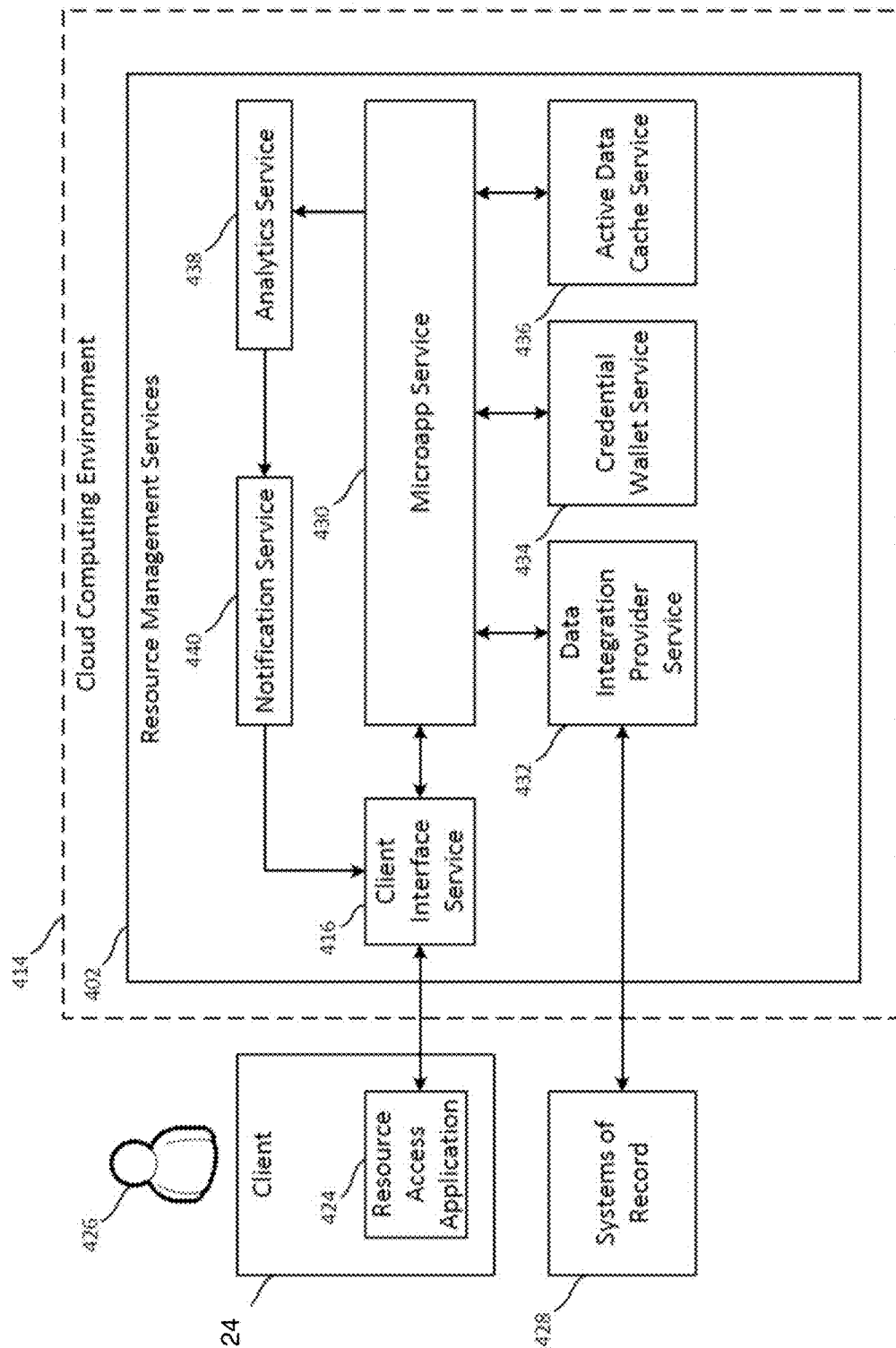
FIG. 4C is an example block diagram similar to that shown in FIG. 4B but in which the available resources are represented by a single box labeled "systems of record," and further in which several different services are included among the resource management services according to one or more example implementations of the disclosure.
Figure 5:
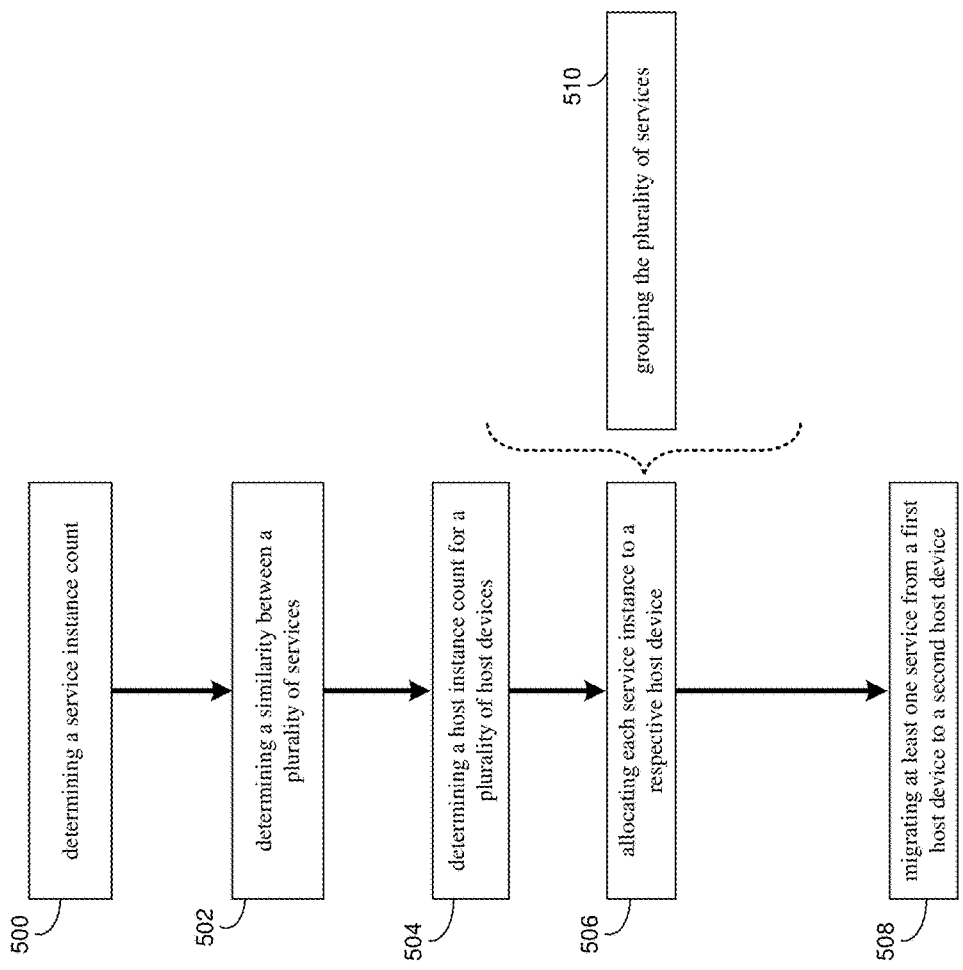
FIG. 5 is an example flowchart of a resource allocation process according to one or more example implementations of the disclosure.
Figure 6:
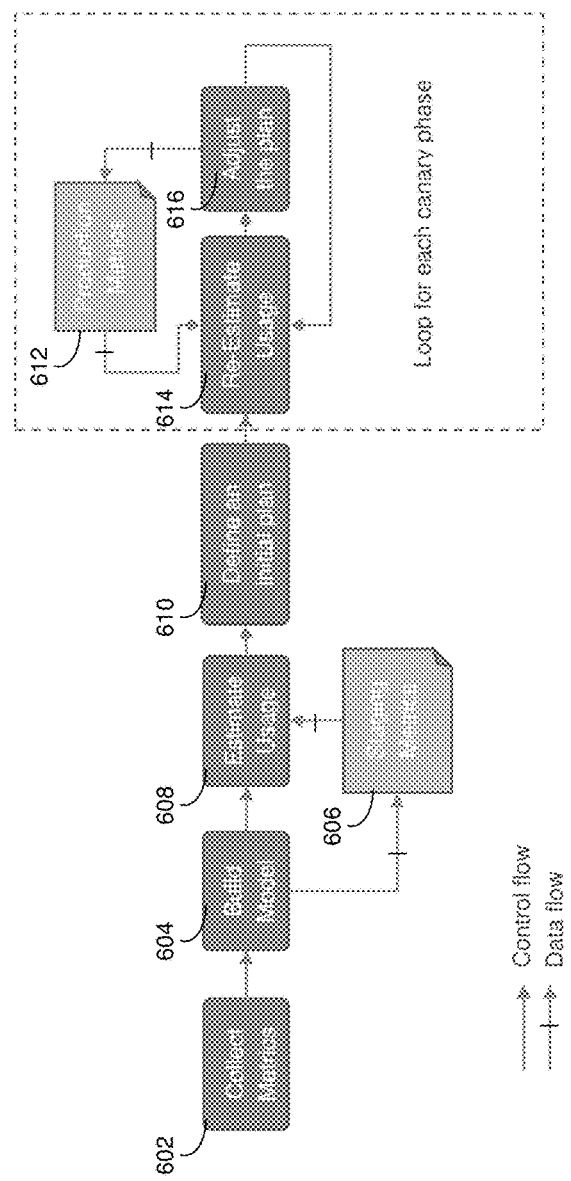
FIG. 6 is an example system flowchart of a resource allocation process according to one or more example implementations of the disclosure.

In some implementations, and referring also to the example implementation of FIG. 4C, an example block diagram is shown similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within resource management services block 402. As explained below, the services shown in FIG. 4C may enable the provision of a streamlined resource activity feed and/or notification process for client electronic device 24. In the example shown, in addition to client interface service 416 discussed above, the services include microapp service 430, data integration provider service 432, credential wallet service 434, active data cache service 436, analytics service 438, and notification service 440. In various implementations, the services shown in FIG. 4C may be employed either in addition to or instead of the different services shown in FIG. 4B.

In some implementations, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users may need to launch an application, navigate to the action they need to perform, and then perform the action. Microapps may streamline routine tasks for frequently performed actions and provide users the ability to perform actions within resource access application 424 without having to launch the native application. The system shown in FIG. 4C may, for example, aggregate relevant notifications, tasks, and insights, and thereby give user 426 a dynamic productivity tool. In some implementations, the resource activity feed may be intelligently populated by utilizing machine learning and artificial intelligence (AI) algorithms. Further, in some implementations, microapps may be configured within cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Systems of record 428 may represent the applications and/or other resources resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. Resource management services 402, and in particular data integration provider service 432, may, for example, support REST API, JSON, OData-JSON, and 6 ML. As explained in more detail below, data integration provider service 432 may also write back to the systems of record, for example, using OAuth2 or a service account.

In some implementations, microapp service 430 may be a single-tenant service responsible for creating the microapps. Microapp service 430 may send raw events, pulled from systems of record 428, to analytics service 438 for processing. The microapp service may, for example, periodically pull active data from systems of record 428.

In some implementations, active data cache service 436 may be single-tenant and may store all configuration information and microapp data. It may, for example, utilize a per-tenant database encryption key and per-tenant database credentials.

In some implementations, credential wallet service 434 may store encrypted service credentials for systems of record 428 and user OAuth2 tokens.

In some implementations, data integration provider service 432 may interact with systems of record 428 to decrypt end-user credentials and write back actions to the systems of record 428 under the identity of the end-user. The write-back actions may, for example, utilize a user's actual account to ensure all actions performed are compliant with data policies of the application or other resource being interacted with.

In some implementations, analytics service 438 may process the raw events received from microapps service 430 to create targeted scored notifications and send such notifications to notification service 440.

Finally, in some embodiments, notification service 440 may process any notifications it receives from analytics service 438. In some implementations, notification service 440 may store the notifications in a database to be later served in a notification feed. In other implementations, notification service 440 may additionally or alternatively send the notifications out immediately to client electronic device 24 as a push notification to user 426.

In some implementations, a process for synchronizing with systems of record 428 and generating notifications may operate as follows. Microapp service 430 may retrieve encrypted service account credentials for systems of record 428 from credential wallet service 434 and request a sync with data integration provider service 432. Data integration provider service 432 may then decrypt the service account credentials and use those credentials to retrieve data from systems of record 428. Data integration provider service 432 may then stream the retrieved data to microapp service 430. Microapp service 430 may store the received systems of record data in active data cache service 436 and also send raw events to analytics service 438. Analytics service 438 may create targeted scored notifications and send such notifications to notification service 440. Notification service 440 may store the notifications in a database to be later served in a notification feed and/or may send the notifications out immediately to client electronic device 24 as a push notification to user 426.

In some implementations, a process for processing a user-initiated action via a microapp may operate as follows. Client electronic device 24 may receive data from microapp service 430 (via client interface service 416) to render information corresponding to the microapp. Microapp service 430 may receive data from active data cache service 436 to support that rendering. User 426 may invoke an action from the microapp, causing resource access application 424 to send that action to microapp service 430 (via client interface service 416). Microapp service 430 may then retrieve from credential wallet service 434 an encrypted Oauth2 token for the system of record for which the action is to be invoked, and may send the action to data integration provider service 432 together with the encrypted Oath2 token. Data integration provider service 432 may then decrypt the Oath2 token and write the action to the appropriate system of record under the identity of user 426. Data integration provider service 432 may then read back changed data from the written-to system of record and send that changed data to microapp service 430. Microapp service 432 may then update active data cache service 436 with the updated data and cause a message to be sent to resource access application 424 (via client interface service 416) notifying user 426 that the action was successfully completed.

In some implementations, in addition to or in lieu of the functionality described above, resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In some implementations, in addition to or in lieu of the functionality described above, resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" Resource management services 402 may, for example, parse these requests and respond because they are integrated with multiple systems on the back-end. In some embodiments, users may be able to interact with the virtual assistance through either resource access application 424 or directly from another resource, such as Microsoft Teams. This feature may allow employees to work efficiently, stay organized, and deliver only the specific information they're looking for.

As discussed above and referring also at least to the example implementations of FIGS. 5-8, at block 500, resource allocation (RA) process 10 may determine a service instance count for each of a plurality of services to be executed on a plurality of host devices. At block 502, RA process 10 may determine a similarity between the plurality of services. At block 504, RA process 10 may determine a host instance count for the plurality of host devices based upon, at least in part, the similarity between the plurality of services. At block 506, RA process 10 may allocate each service instance to a respective host device for execution based upon, at least in part, the similarity between the plurality of services, the service instance count, and the host service count. At block 508, RA process 10 may migrate at least one service of the plurality of services from a first host device of the plurality of host devices to a second host device of the plurality of host devices. At block 510, allocating each service instance may include grouping services of the plurality of services on at least one host device of the plurality of host devices based upon, at least in part, the correlation of resource consumption for the grouped services In some implementations, at block 500, resource allocation (RA) process 10 may determine a service instance count for each of a plurality of services to be executed on a plurality of host devices. In some implementations, the service instance count may be determined based upon, at least in part, a resource capacity model and usage data. For instance, generally, there may be at least two ways to build/renew a resource capacity model. First, RA process 10 may build the resource capacity model early in the staging environment, because staging shares the same code as production and they may be different from user scales. Second, RA process 10 may renew the model in the canary release period, and collect data within different user scales as the system gradually switches customers from the old release to the new one. For example, RA process 10 may collect a request count and usage data for each service of a plurality of services (e.g., each service of Workday or other similar environment) for a given period of time (e.g., at least 1 day), and may group them within a pre-defined time interval (e.g., 30 minutes) in the staging environment, which may be used to build the resource capacity model. Referring at least to the example implementation of FIG. 7, a function fit chart 700 is shown for a resource capacity model of an example trust service (e.g., for request counts per 30 minutes for the average CPU usage). Generally, a resource capacity model (such as the one shown in FIG. 7 and discussed further below) may reveal the relationship between the service request density (number of requests) and resource consumption. In this example, the request density is the average requests/minute in 30 minute intervals, and resource consumption is the average CPU usage in 30 minute intervals. Regarding FIG. 7, it is shown that, e.g., a 15 k-20 k requests/minute load will have the best resource usage efficiency. In production, if it is shown that the total average requests/minute data (e.g., 155 k requests/minute), then the suggested instance count should be 8-11. As such, either 9 or 10 instances is ok.

Figure 7:
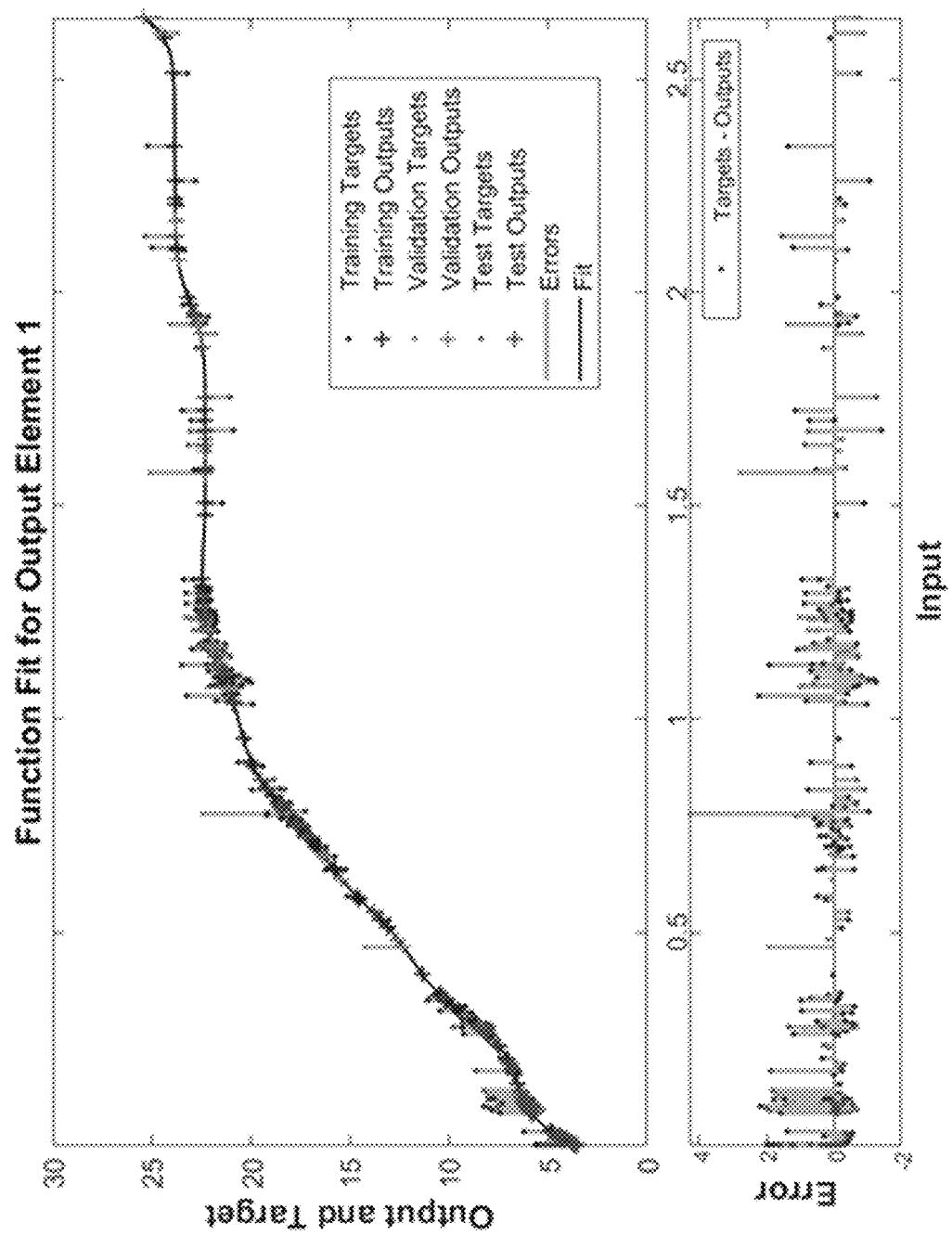
FIG. 7 is an example diagrammatic view of a function fit chart of a resource capacity model according to one or more example implementations of the disclosure.

Referring still at least to the example implementation of FIG. 7, the X-axis may be the average requests per minute in each interval (e.g., 30 minutes). At 1.5, it is shown that the average request density is 15 k requests/minute. The Y-axis is the average resource consumption (e.g., the number of CPU cores consumed). In some implementations, liner regression may be used to get the resource capacity model based on the actual data, and the error chart may show, in the example, the Mean Squared Error (MSE) of the liner regression result. Note that memory may be highly correlated to CPU usage and if the proper machine type to execute the service is chosen, that requirement needed to execute the services should be able to be covered. It will be appreciated that while CPU and memory resources (which may have a linear relation) are used in the example, there are many types of resources that a service may use (e.g., CPU, memory, disk I/O, network I/O, etc.). As such, the use of CPU usage and memory as the usage data should be taken as example only and not to otherwise limit the scope of the present disclosure. From FIG. 7, it is shown that if the request count is smaller than, e.g., 10000, the resource usage (e.g., CPU) is liner, and when the request count ranges from, e.g., 10000-25000, the resource usage essentially does not increase. Further, when the request count is greater than, e.g., 25000, the resource usage starts to increase again. This may mean that RA process 10 can keep the instance count at a reasonable level that takes, e.g., 20000 requests. Under this conclusion, if RA process 10 already knows the total request count (from the resource capacity and usage model), RA process 10 may be able to choose the most reasonable instance count that should be able to save as much of the resources as possible.

Once RA process 10 has the resource capacity model, RA process 10 may choose the optimal service instance count according to current estimated user scale. The estimation of user scale may be determined from usage from the old release, and if this is a new service, RA process 10 may make the canary roll out slower so that there is enough data to collect when providing service to more customers. For example, RA process 10 may choose the optimal service instance count that is able to handle the current load according the resource capacity model and estimated user scale. As an example, and referring at least to the example implementation of FIG. 6, a process flowchart 600 of the overall RA process is shown. In step 602, the pre-release (staging) step, RA process 10 may collect the usage data of a new release (e.g., the above-noted requests/minute, CPU usage, etc.) for each service and each instance. By combining that data and grouping them by some predefined interval (e.g., 30 minutes), RA process 10 may build the resource capacity model for each service at step 604. When it comes to the release in step 606, RA process 10 may in step 608 use the staging data and the resource capacity model to estimate the initial production usage data (e.g., in staging there may be 100 customers that can produce 1 k requests for service A, and when it comes to production, there may be 10,000 customers but only enable 1% for canary testing purposes, the estimated request may then be 1 k, resulting in the instance count defined in the initial plan in step 610). In each canary release period in step 612, RA process 10 may collect the data (production metrics) to renew the resource capacity model. In step 614, RA process 10 may re-estimate the next release period and adjust the plan in step 616.

In some implementations, at block 502, RA process 10 may determine a similarity between the plurality of services. For example, the similarity between the plurality of services may be based upon, at least in part, a correlation of resource consumption for the plurality of services, and the plurality of services may be grouped on at least one host device of the plurality of host devices based upon, at least in part, the correlation of resource consumption for the plurality of services, where the correlation of resource consumption for the plurality of services may be based upon, at least in part, historical resource consumption data for the plurality of services. For instance, RA process 10 may analyze the relationship between different services, e.g., by analyzing the time-series performance data between services with cosine correlation (e.g., a similarity calculation method for vectors that may take the usage data for each service instance to calculate the average cosine similarity of the average CPU/minute), RA process 10 may determine the less related services and put them together on a host device to avoid spike superposition between different services. For instance, RA process 10 may use the above-noted staging data (e.g., staging metrics to estimate usage noted from FIG. 6) to analyze the relationship between different services and come up with an initial deployment plan. RA process 10 may generate a service usage correlation matrix (e.g., the cosine correlation for each service) according to the historical data to better decide the placement of micro-services on the host devices. As an example, highly correlated (similar) services are better not to be put together on the same host device. This is because if they are highly correlated, it means the resources usage spike usually shows up along with other spikes. If not, the resource is likely to be consumed very quickly when there is a rapid growth of requests (user scale). Thus, the objective is to place highly correlated service into different host devices. That is, if service A is too similar to service B, then a spike in resource requirements for service A will likely similarly result in a spike in resource requirements for service B, which may be more than the host device executing the services can handle. As such, it may be beneficial to place services that have less of a similarity on the same host device.

As will be discussed below, after determining the instance count and correlation matrix, RA process 10 may determine the recommended host count by first solving a predefined optimization problem equation to find the similarity of the services. Here host instance count is N (determined using FIG. 8 and discussed below). After the host instance count is obtained, RA process 10 may determine the deployment plan to avoid resource race condition. Thus, to determine the similarity of the services, RA process 10 may solve an optimization equation. For instance, based upon the above-noted model and historical usage, RA process 10 may use the potential max resource consumption of each service to make an estimation, making sure the usage of the host device will not be larger than some threshold, e.g., 70%. To avoid the above-noted spike, RA process 10 is seeking to find a smaller correlation between services overall. In the example, if a result is not able to be found, RA process 10 may make N=N+2 (where N is the host device count) and resolve it again. An example of the optimization equation is provided below (to find the best deployment plan of services with a minimum overall similarity), however, it will be appreciated that variations in the equation may be used without departing from the scope of the disclosure.

$$obj \ \min \frac{1}{2} \sum_{k=0}^{N-1} \left[ \sum_{i=0, i \neq j}^{M-1} \sum_{j=0}^{M-1} s_{ij} x_{ik} x_{jk} + \sum_{i=0}^{M-1} s_{ii} x_{ik} (x_{ik} - 1) \right]$$

$$\text{s.t.} \sum_{k=0}^{N-1} x_{ik} = n_i, i = 0, 1, K, M-1 \quad (1)$$

$$\sum_{i=0}^{M-1} c_i x_{ik} \leq 0.7C, k = 0, 1, K, N-1 \quad (2)$$

$$\sum_{i=0}^{M-1} m_i x_{ik} \leq 0.7Mem, k = 0, 1, K, N-1 \quad (3)$$

Where N: host device number
M: number of Services type
$n_i$, i=0,1,K,M−1: instance number for each kind of service
$c_i$, i=0,1,K,M−1: CPU required by each kind of service
$m_i$, i=0,1,K,M−1: memory required by each kind of service
C: CPU number of host device
Mem: Memory capacity of host device
$S_{ij}$, i=0,1,K,M−1, j=0,1,K,M−1: Cosine similarity between service i and service j
$x_{ik}$, i=0,1,K,M−1, k=0,1,K,N−1: instance number of service i on host k.

This optimization method attempts to determine the resource placement plan that has the lowest overall similarity, which is the cosine similarity here. In this equation, RA process 10 has already determined the host instance count, the cosine metrics for each service, and each service instance count. However, what is not known is which service should be deployed on which node (host). Since there may be many combinations, among those combinations may be the best solution (i.e., lowest similarity), and this function tries to find out that combination.

Figure 8:
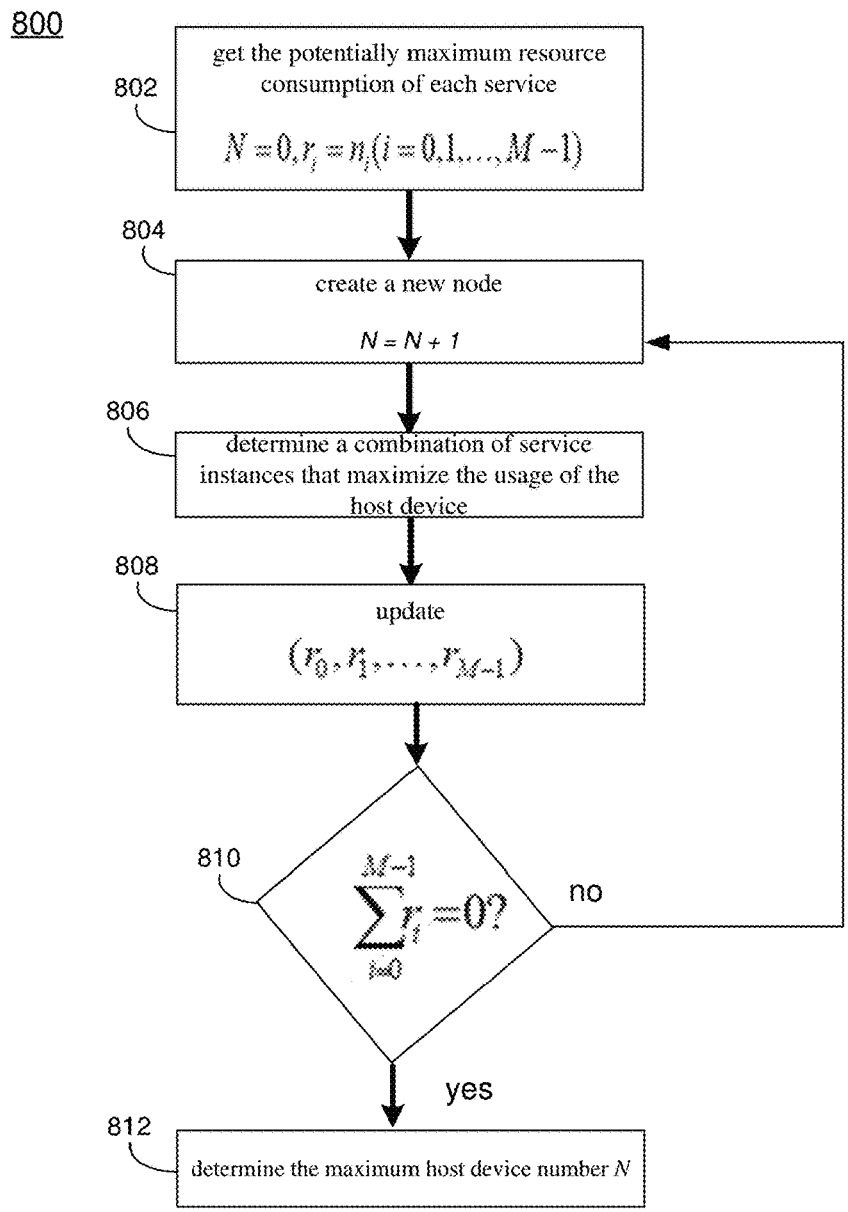
FIG. 8 is an example flowchart of determining a host instance count for use with a resource allocation process according to one or more example implementations of the disclosure.

In some implementations, at block 504, RA process 10 may determine a host instance count for the plurality of host devices based upon, at least in part, the similarity between the plurality of services, where the host instance count may be determined based upon, at least in part, a usage threshold of at least one host device of the plurality of host devices. An example flowchart 800 of a greedy algorithm for determining the host instance count is shown in FIG. 8 and generally described throughout. Continuing with the above example, RA process 10 may use a greedy algorithm (or other algorithm) to determine the recommended host device machine count N (where N is odd). For example, at block 802, RA process 10 may estimate the request load of the next release period, and may use the resource capacity model to choose the usage instance count for each type of service. For instance, RA process 10 may estimate the max resource consumption for each service according to historical data. For instance, before releasing to production, RA process 10 may collect production historical usage data, and estimate the usage per service at, e.g., 10% of total user scale. If the released service is an existing service, the user scale may be easier to estimate, but if this is a new service, RA process 10 may determine a relatively conservative value (making it larger) and may adjust it later. At block 804, RA process 10 may create a new node. At block 806, RA process 10 may make sure that CPU and memory usage is smaller than 70% for performance purposes, and there may be a service placement schedule that will maximize the resource usage. For instance, assume for example purposes only that RA process 10 sets the usage threshold at, e.g., 70%, and starts the service placement. For each service, RA process 10 may place them into a cluster (e.g., node cluster). In the example, if the threshold <70%, there is no need to add any additional host devices (i.e., there is no issue with resource consumption), but if the threshold >70%, there may not be enough resources for the services, and RA process 10 may add a new host device to the cluster. If the host device count N is even, RA process 10 may add 1 to make it odd (e.g., when a particular micro service platform requires the service instance count to be odd, as some specific services may require a leader, and the platform vote (using a quorum algorithm) may choose the leader, and thus to avoid a tie in the vote the instance count must be odd; however, it will be appreciated while the cluster number is usually odd, a cloud service provider deployment template may be checked if an even cluster number may be used). At block 808, services that have already been placed on the new node are remove them from pool of services that still need to be placed. At block 810, RA process 10 may check if all services have been placed on the nodes. If they have not, then another node may be created to add additional services. If they have, the output for the recommended host device machine count N is output.

In some implementations, at block 506, RA process 10 may allocate each service instance to a respective host device for execution based upon, at least in part, the similarity between the plurality of services, the service instance count, and the host service count. For instance, based upon the similarity between the services (using the optimization equation), the service instance count, and the host instance count, RA process 10 may allocate resources for the services to be executed on particular host devices, such that specific types of services and a specific number of services are grouped at block 510 and executed on a specific number of host devices.

In some implementations, once RA process 10 determines the initial deployment strategy (i.e., the number of service instances, the number of host device instances, and the grouping of services on the host device instances), the release may be started. During the canary release process, RA process 10 may need to adjust the model, as well as instance/host counts according to the user scale of the next release period and the renewed functions/matrix (e.g., putting the data and staging test data together and re-calculate everything). For instance, in each canary release period, RA process 10 may estimate the resource usage of the next release period, and may adjust the host device count, service instance count, and instance optimization plan accordingly as described above.

In some implementations, at block 508, RA process 10 may migrate at least one service of the plurality of services from a first host device of the plurality of host devices to a second host device of the plurality of host devices. For example, RA process 10 may continue to monitor the usage of all existing host devices to determine whether a service may need to be migrated from one host device to another host device. For example, if one host device is determined no longer to be suitable for the current deployment plan, one or more services may be migrated to a different host device. For example, based on the average resource usage, RA process may select for removal from a host device at least one service that will allow the resources of the host device to drop to a reasonable value (e.g., below the above-noted 70% threshold). To determine which host device to which to migrate the removed service(s), RA process 10 may identify all the host devices that currently have enough room for this service (such that after migration the resources of the host devices would not exceed the 70% threshold). Similarly as discussed above, RA process 10 may determine the cosine correlation of the service to be removed to the services on the potential host device to receive that service, where the host device with the services having the smallest correlation (similarity) to the service to be migrated to that host device may be selected to receive the migrated service. In some implementations, if there is no host device that satisfies the requirements discussed above, another host device may be added to receive the migrated service. In some implementations, if RA process 10 determines that any service consumes more resources than expected (according to the resource capacity model) and may cause potential problems in the next canary release, RA process 10 may send an alert to those responsible for addressing such a problem (e.g., Operations, Customer Quality Engineers (CQEs), etc.).

It will be appreciated that while WorkSpace is described above, any micro-service host environment, including but not limited to Service-Fabric, Kubernetes, Mesos, etc. may be used when releasing web-service in Canary, Test/Staging/Production way without departing from the scope of the present disclosure.

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code or machine code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a body area network BAN), a personal area network (PAN), a metropolitan area network (MAN), etc., or the connection may be made to an external computer (for example, through the internet using an Internet Service Provider). In some implementations, electronic circuitry including, for example, programmable logic circuitry, an application specific integrated circuit (ASIC), field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A method comprising:
   determining, by a computing device, a service instance count for each of a plurality of services to be executed on a plurality of host devices, wherein the service instance count defines a number of copies of code of a service for each respective service of the plurality of services to be executed on the plurality of host devices;
   determining a similarity between the plurality of services;
   determining a host instance count for the plurality of host devices based upon, at least in part, the similarity between the plurality of services; and
   allocating each service instance to a respective host device for execution based upon, at least in part, the similarity between the plurality of services, the service instance count, and the host instance count, wherein service instances of the plurality of services that have less of a similarity to other service instances of the plurality of services are allocated to the respective host device for execution.

2. The method of claim 1 wherein the service instance count is determined based upon, at least in part, a resource capacity model and usage data.

3. The method of claim 1 wherein the similarity between the plurality of services is based upon, at least in part, a correlation of resource consumption for the plurality of services.

4. The method of claim 3 wherein allocating each service instance includes grouping services of the plurality of services on at least one host device of the plurality of host devices based upon, at least in part, the correlation of resource consumption for the grouped services.

5. The method of claim 4 wherein the correlation of resource consumption for the plurality of services is based upon, at least in part, historical resource consumption data for the plurality of services.

6. The method of claim 1 wherein the host instance count is determined based upon, at least in part, a usage threshold of at least one host device of the plurality of host devices.

7. The method of claim 1 further comprising migrating at least one service of the plurality of services from a first host device of the plurality of host devices to a second host device of the plurality of host devices.

8. A computer program product residing on a non-transitory computer readable storage medium having a plurality of instructions stored thereon which, when executed by one or more processors, causes the one or more processors to perform operations comprising:
 determining a service instance count for each of a plurality of services to be executed on a plurality of host devices, wherein the service instance count defines a number of copies of code of a service for each respective service of the plurality of services to be executed on the plurality of host devices;
 determining a similarity between the plurality of services;
 determining a host instance count for the plurality of host devices based upon, at least in part, the similarity between the plurality of services; and
 allocating each service instance to a respective host device for execution based upon, at least in part, the similarity between the plurality of services, the service instance count, and the host instance count, wherein service instances of the plurality of services that have less of a similarity to other service instances of the plurality of services are allocated to the respective host device for execution.

9. The computer program product of claim 8 wherein the service instance count is determined based upon, at least in part, a resource capacity model and usage data.

10. The computer program product of claim 8 wherein the similarity between the plurality of services is based upon, at least in part, a correlation of resource consumption for the plurality of services.

11. The computer program product of claim 10 wherein allocating each service instance includes grouping services of the plurality of services on at least one host device of the plurality of host devices based upon, at least in part, the correlation of resource consumption for the grouped services.

12. The computer program product of claim 11 wherein the correlation of resource consumption for the plurality of services is based upon, at least in part, historical resource consumption data for the plurality of services.

13. The computer program product of claim 8 wherein the host instance count is determined based upon, at least in part, a usage threshold of at least one host device of the plurality of host devices.

14. The computer program product of claim 8 wherein the operations further comprise migrating at least one service of the plurality of services from a first host device of the plurality of host devices to a second host device of the plurality of host devices.

15. A computing system comprising:
 a memory; and
 at least one processor in communication with the memory, the at least one processor configured to:
 determine, by a computing device, a service instance count for each of a plurality of services to be executed on a plurality of host devices, wherein the service instance count defines a number of copies of code of a service for each respective service of the plurality of services to be executed on the plurality of host devices;
 determine a similarity between the plurality of services;
 determine a host instance count for the plurality of host devices based upon, at least in part, the similarity between the plurality of services; and
 allocate each service instance to a respective host device for execution based upon, at least in part, the similarity between the plurality of services, the service instance count, and the host instance count, wherein service instances of the plurality of services that have less of a similarity to other service instances of the plurality of services are allocated to the respective host device for execution.

16. The computing system of claim 15 wherein the service instance count is determined based upon, at least in part, a resource capacity model and usage data.

17. The computing system of claim 15 wherein the similarity between the plurality of services is based upon, at least in part, a correlation of resource consumption for the plurality of services.

18. The computing system of claim 17 wherein allocating each service instance includes grouping services of the plurality of services on at least one host device of the plurality of host devices based upon, at least in part, the correlation of resource consumption for the grouped services, and wherein the correlation of resource consumption for the plurality of services is based upon, at least in part, historical resource consumption data for the plurality of services.

19. The computing system of claim 15 wherein the host instance count is determined based upon, at least in part, a usage threshold of at least one host device of the plurality of host devices.

20. The computing system of claim 15 wherein the processor is further configured to migrate at least one service of the plurality of services from a first host device of the plurality of host devices to a second host device of the plurality of host devices.

* * * * *